United States Patent [19]

Hespelt

[11] Patent Number: 5,100,165

[45] Date of Patent: Mar. 31, 1992

[54] INDEPENDENT WHEEL SUSPENSION FOR STEERABLE WHEELS OF MOTOR VEHICLES

[75] Inventor: Achim Hespelt, Stuttgart, Fed. Rep. of Germany

[73] Assignee: Daimler-Benz Aktiengesellschaft, Fed. Rep. of Germany

[21] Appl. No.: 607,632

[22] Filed: Oct. 31, 1990

Related U.S. Application Data

[63] Continuation of Ser. No. 197,428, May 19, 1988, abandoned.

[30] Foreign Application Priority Data

May 19, 1987 [DE] Fed. Rep. of Germany ....... 3716706

[51] Int. Cl.$^5$ .................. B60G 3/18; B60G 11/00; D62D 6/04
[52] U.S. Cl. ................................ 280/675; 280/696; 280/692
[58] Field of Search .............. 280/691, 692, 693, 696, 280/668, 675, 660, 662, 663, 665, 666, 695, 690, 697, 701, 698; 267/228, 248

[56] References Cited

U.S. PATENT DOCUMENTS

| 2,027,577 | 1/1936 | Crane | 280/696 |
|---|---|---|---|
| 4,671,531 | 6/1987 | Sautter | 280/690 |
| 4,703,947 | 11/1987 | Tattermusch et al. | 280/689 |
| 4,863,188 | 9/1989 | Killian | 280/675 |

FOREIGN PATENT DOCUMENTS

| 2264278 | 7/1974 | Fed. Rep. of Germany | 280/696 |
|---|---|---|---|
| 1938850 | 1/1976 | Fed. Rep. of Germany | 280/660 |
| 3714688 | 2/1988 | Fed. Rep. of Germany | 280/675 |
| 870789 | 6/1961 | United Kingdom | 280/693 |
| 2172254 | 9/1986 | United Kingdom | 280/696 |

OTHER PUBLICATIONS

Derwent Abstract to DE 3714-688-A (18 Feb. 1988).

Primary Examiner—Charles A. Marmor
Assistant Examiner—Karin Tuson
Attorney, Agent, or Firm—Evenson, Wands, Edwards, Lenahan & McKeown

[57] ABSTRACT

The wheel carrier of an independent wheel suspension for steerable wheels of motor vehicles is pivotal about a steering axis which is so inclined that the steering point in a plan view on the wheel suspension is located outside of the point of contact of the wheel with the road. In order to prevent that with dynamic wheel load fluctuations about the steering axis, a moment pivoting the wheel carrier can occur which is customarily transmitted by way of the steering arm and steering tie-rod to the steering wheel and which has to be braced by muscle force, a wheel guide member is formed by two individual guide links which extend arrow-shaped in the direction toward the wheel carrier and are cardanically supported. At least one obliquely positioned support member is arranged between one of these individual guide links and the vehicle body, which in case of wheel load fluctuations transmits onto the individual guide link support forces in which a support force component is effective, by means of which a moment is produced that is essentially equally large and directed opposite to the moment about the steering axis resulting at the wheel carrier from the wheel load fluctuation.

4 Claims, 2 Drawing Sheets

INDEPENDENT WHEEL SUSPENSION FOR STEERABLE WHEELS OF MOTOR VEHICLES

This is a continuation of application Ser. No. 07/197,428, filed May 19, 1989 now abandoned.

BACKGROUND AND SUMMARY OF THE INVENTION

The present invention relates to an independent wheel suspension for steerable wheels of motor vehicles, with a wheel carrier and a wheel guide member formed by two individual guide links pivotally connected at the vehicle body and the wheel carrier which, in the straight position of the wheel carrier, extend in an arrow-like manner onto the wheel carrier and which together with a further wheel guide member for the wheel carrier define an imaginary instantaneous steering axis that is positioned obliquely to the plane of the point of contact of the wheel with the road surface and extends through the same outside this point of contact.

A wheel suspension of this type is already known in the prior art (DE-AS 19 38 850). Common to this prior art wheel suspension and all other known constructions of independent wheel suspensions is that dynamic wheel load fluctuations, conditioned by the inclination of the steering axis, produce a moment about the same which is transmitted to the steering wheel by way of a steering arm and a steering tie-rod and must ultimately be braced at the steering wheel by muscle force.

The present invention is concerned with the task to so improve a wheel suspension of the aforementioned type that dynamically changing wheel contact forces are no longer noticeable by the driver in a disagreeable manner and that the prestress of the steering linkage resulting from the moment effective about the steering axis can be reduced, respectively, the steering linkage can ultimately be unstressed.

The underlying problems are solved according to the present invention in that at least one obliquely positioned support member elastic in the support direction is arranged between one of the two individual guide links and the vehicle body and in that the support force transmitted from the support member to the individual guide link is directed in such a manner that a support force component extending transversely to the longitudinal direction of the guide link produces a further moment counteracting the moment occurring about the steering axis.

The support member provided in accordance with the present invention which is supported at one of the individual guide members and at the vehicle body forms a component of the wheel suspension that does not contribute any components for the wheel guidance. It may be formed, for example, by a shock absorber, a coil spring, or a torsion rod stabilizer supported in a suitable manner on the individual guide link. These components may also be supported thereby in a corresponding combination in common on the individual guide link and at the vehicle body.

The present invention is equally advantageously suited for wheel suspensions which, in addition to the wheel guide member subdivided into two individual guide links, include a further wheel guide member in the form of a shock absorber leg or spring leg, of a longitudinal guide link or of a cross guide link. In case of a double transverse guide member axle, the upper or the lower cross guide member can be subdivided into two individual guide links for the support of the support member.

Preferably the lower guide member is subdivided into two individual guide links and the support member or members are supported on the individual guide link located to the rear, as viewed in the driving direction.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

FIG. 3 shows a modified version of the suspension which has two upper links.

DETAILED DESCRIPTION OF THE DRAWINGS

Figure 1:
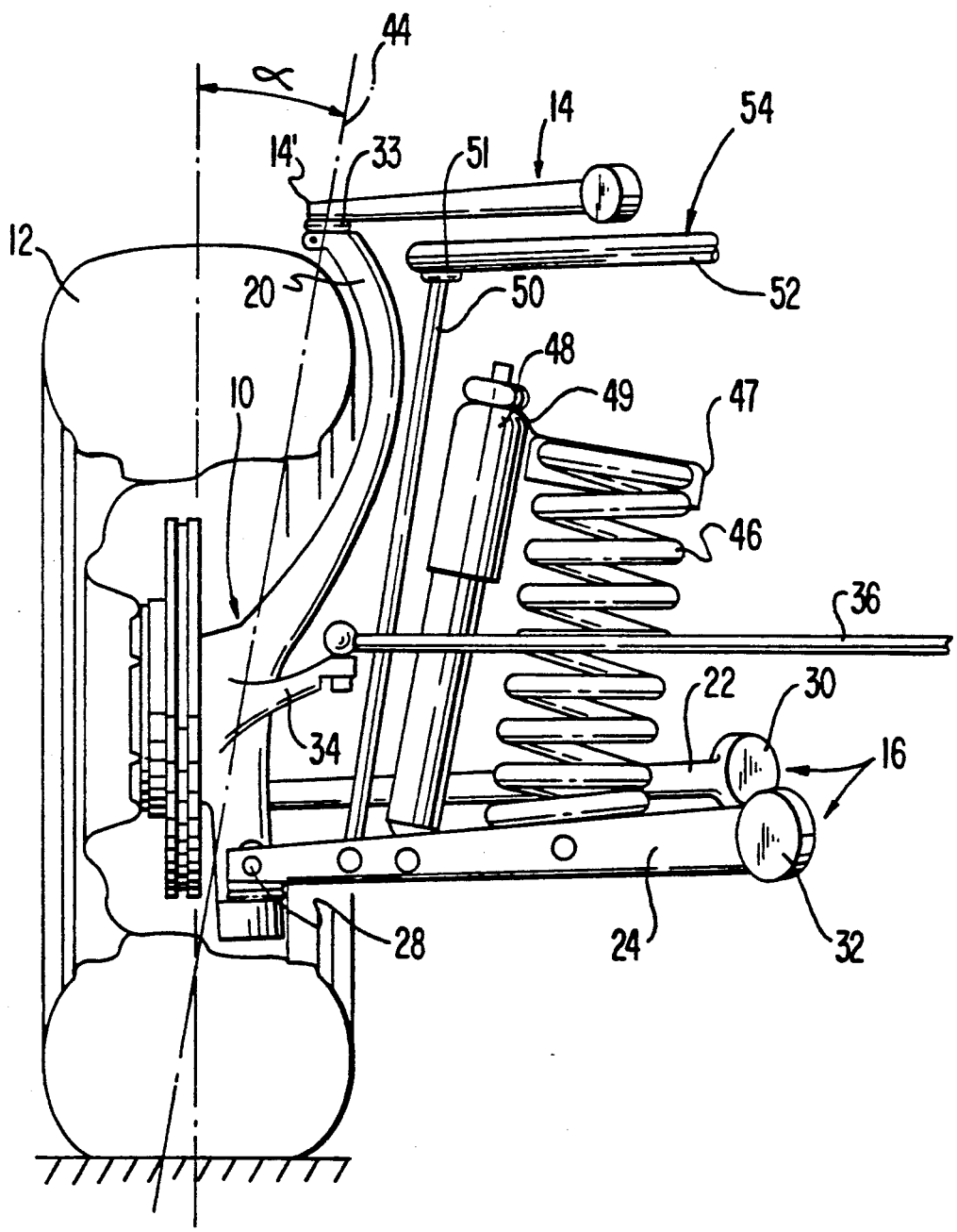
FIG. 1 is a rear elevational view of a wheel suspension for a steerable front wheel in accordance with the present invention.

Referring now to the drawing wherein like reference numerals are used throughout the two views to designate like parts, reference numeral 10 generally designates in the illustrated wheel suspension a wheel carrier supporting a steerable front wheel 12, whereby the wheel carrier 10 is pivotally supported at the vehicle body 18 by means of an upper and a lower wheel guide member generally designated by reference numeral 14 and 16, respectively.

The upper wheel guide member 14 forms a cross guide member constructed, for example, as triangular or wishbone guide member which is connected with its link end 14' extending at an acute angle in the direction toward the front wheel 12, at a lateral neck 20 of the wheel carrier 10 that extends laterally in the upward direction at the front wheel 12.

The lower wheel guide member 16 extending transversely to the driving direction F is subdivided into two individual guide links 22 and 24 extending toward one another in the direction toward the wheel carrier 10 when the wheel carrier is in the straight driving position; the individual guide links 22 and 24 are pivotally supported at the wheel carrier 10 at 26, respectively, 28 and are pivotally movably supported at the vehicle body 18 at 30 and 32. For carrying out steering movements, the wheel carrier 10 is provided with a steering arm 34, at which is pivotally connected a steering tie-rod 36 of a steering arrangement of the vehicle.

The joints 30 and 32 on the side of the body and the joints 26 and 28 on the side of the wheel carrier of the individual guide links 22 and 24 make it cooperate with the upper wheel guide member 14 to carry out cardanic movements during compression spring deflections and steering movements of the wheel 10.

Figure 2:
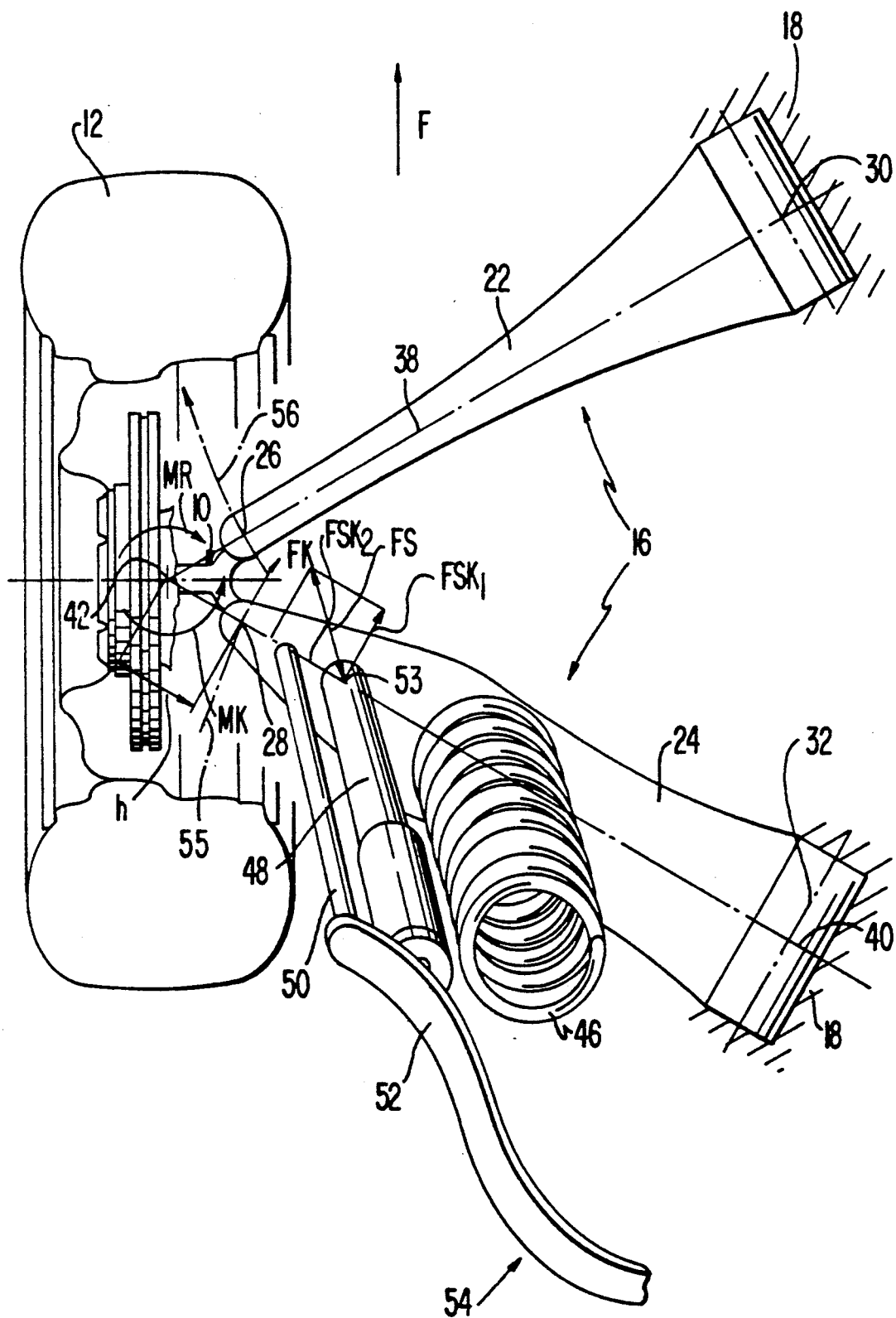
FIG. 2 is a top plan view on the wheel suspension of FIG. 1, but without the upper wheel guide members

In the instant embodiment, both individual guide links 22 and 24 are in a common plane. The steering joints 26 and 30 as well as 28 and 32 are located each on a straight line 38, respectively, 40 which intersect at 42 (FIG. 2). This point of intersection 42 defines a lower imaginary steering joint (Pole) of the wheel carrier 10.

A straight line extending through the upper joint point 33 of the wheel carrier 10 and the point of intersection 42 defines an imaginary steering axis 44 of the front wheel 12 having a steering angle α and producing, for example, a negative steering offset (scrub radius), which, for example, is set correspondingly obliquely forwardly and downwardly in the driving direction F in order to assure a positive wheel caster. The individual guide links 22 and 24 may also be arranged skew whereby in this case the point of intersection 42 of the straight lines 38 and 40 cannot be shown in the drawing.

A coil spring 46, a shock absorber 48 and a support part 50 of a leg 52 of a U-shaped torsion rod stabilizer 54 are also shown in the drawing. These parts form each by itself a support member which are supported on the rear individual guide link 24, as viewed in the driving direction F. The shock absorber 48 and the support part 50 are thereby movably supported on the individual guide link 24. The support of the parts 46, 48 and 50 could also be provided at the other individual guide link 22, however, the illustrated rear support offers more favorable installation possibilities, especially as regards the installation space which is available.

The arrangement of the upper supports 47 and 49 on the side of the body of the coil spring 46 and of the shock absorber 48 as well as of the point of pivotal connection 51 of the support part 50 of the torsion rod leg 52 is so selected in space that they are located as viewed in plan view, according to FIG. 2, for example, considerably to the rear of the straight line 40 of the rear individual guide link 24, in relation to the driving direction F. The parts 46, 48 and 50 extend thereby in the direction toward this individual guide link 24 obliquely forwardly and outwardly.

As a result of the interconnection of the parts 46, 48 and 50, the support forces FS (FIG. 2) at the support points 53, which become effective at the individual guide link 24 in case of dynamically varying wheel contact forces, are decomposed into the two force components $FSK_1$ and $FSK_2$, as illustrated in FIG. 2 only for the shock absorber 48, whereby the effect of the force component $FSK_1$ resulting from the inclined positioning of these parts 46, 48 and 50 will be discussed more fully hereinafter.

In case of dynamic wheel load fluctuations which may result, for example, from unevennesses of the road surface, the inclined interconnection of the steering axis 44 in the wheel suspension produces a moment in the direction of the arrow MR about the steering axis. The latter acts ultimately on the steering wheel by way of the steering arm 34 and the steering tie-rod 36 and has to be braced by the driver.

The described arrangement of the coil spring 46, of the shock absorber 48 and of the support member 50 between the individual guide link 24 and the vehicle body 18 eliminates this disadvantage. With dynamically changing wheel contact forces the force component $FSK_1$ which is effective at the individual guide link 24 according to FIG. 2 in plane of the drawing perpendicularly to the straight line 40 and is directed toward the individual guide link 22, causes a pivoting of the individual guide link 24 in the plane of the drawing about its joint point 32 on the side of the body whereby the joint point 28 on the side of the wheel carrier moves along the track curve 55 and the joint point 26 on the side of the wheel carrier of the individual guide link 22 along the track curve 56.

A counter-moment MK is thereby produced at the wheel carrier 10 opposite the moment MR by the pivot force FK effective at the joint point 28 and the distance h of the joint point 28 from the point of intersection 42 located on the steering axis 44 which distance forms a lever arm, respectively, moment arm.

By a corresponding selection of the inclination of the support members formed by the coil spring 46, by the shock absorber 48 and by the support part 50, equality of the two moments MR-MK can be achieved so that the moment MR is fully compensated for a spring and steering position (for example, design position-straight position of the wheel carrier 10).

A modification of the described wheel suspension can also consist in that the upper wheel guide member 14, analogous to the lower wheel guide member 16 is to be provided in the form of two individual guide links 14', 14" (FIG. 3) which extend toward one another in the direction toward the wheel carrier 10 and which have a link end 14' with a joint 14'" therebetween. In this case, the coil spring 46 and shock absorber 48 could also be supported at an individual guide link of the upper wheel guide member 54 whereas the shock absorber 48 could be supported at one of the individual guide links 22, 24 of the lower wheel guide member 16. In case of a spring leg axle, the support part 50 of the torsion rod stabilizer 54 could be provided exclusively as support member whose support could take place at one of the two individual guide links 22 or 24. In case of a shock absorber leg, the support part 50 and the coil spring 46 could be used as support member whereas in a wheel suspension with an upper cross guide member, the coil spring 46 could also be supported at the upper cross guide member and the shock absorber 48 and the support part 50 at one of the two lower individual guide links 22, respectively, 24 in the explained oblique position.

The present invention finally offers the following advantages with simultaneous use of several support members:

At least one of the support members, for example, the coil spring 46, can be utilized by corresponding inclined positioning to correspondingly increase the moment MR occurring about the steering axis 44 for the purpose of increasing the prestress of the steering linkage.

The inclined position of the other, respectively, of the remaining support members engaging at the same or at other cross guide members, by contrast, can be so selected that a moment resulting from dynamic wheel load fluctuations no longer has to be braced at the steering wheel.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An independent wheel suspension for steerable wheels of motor vehicles, comprising a wheel carrier and a wheel guide member formed by forward and rearward individual guide links pivotally connected at a vehicle body and at the wheel carrier; the individual guide links extending, in the straight position of the wheel carrier, arrow-shaped in the direction toward the wheel carrier and, together with a further wheel guide member, defining an imaginary instantaneous steering axis for the wheel carrier which is positioned obliquely to a plane of the point of contact of the wheel with the road surface and extends through said plane outside of the point of contact of the wheel with the road surface such that a moment about the steering axis occurs which, with respect to its magnitude, is a function of the wheel contact force; at least one obliquely positioned support member, which is elastic in an operating direction, is arranged between a rearward one of the individual guide links and the vehicle body such that a support force transmitted form the at least one obliquely positioned support member to the individual guide link is directed with a support force component extending transversely to a longitudinal direction of the individual guide link produces a further moment counteracting the moment occurring about the steering axis, wherein for a suspending and steering position the moment, which is a function of the wheel contact force, is compensated by the counteracting moment by selective inclination of the at least one obliquely positioned support member.

2. The wheel suspension according to claim 1, wherein the at least one obliquely positioned support member comprises a coil spring, a shock absorber and a torsion rod stabilizer.

3. The wheel suspension according to claim 1, wherein a second wheel guide member is pivotally connected to the wheel carrier, so as to constitute upper and lower wheel guide members and at least the lower wheel guide member is subdivided into the two individual guide links.

4. The wheel suspension according to claim 3, wherein the at least one obliquely positioned support member comprises a coil spring, a shock absorber and a torsion rod stabilizer.

* * * * *